United States Patent Office 3,357,964
Patented Dec. 12, 1967

3,357,964
PROCESS FOR THE POLYMERIZATION OF VINYL AROMATIC COMPOUNDS
Nicolaas J. H. Gülpen, Schalkhaar, and Hans G. Gerritsen, Deventer, Netherlands, assignors to Koninklijke Industrieele Maatschappij Noury & van der Lande N.V., a corporation of the Netherlands
No Drawing. Filed July 1, 1964, Ser. No. 379,741
Claims priority, application Great Britain, July 2, 1963, 26,249/63
3 Claims. (Cl. 260—93.5)

This invention relates to the preparation of polymers from vinyl-aromatic monomers, and to the resulting polymers.

It is known that vinylaromatic monomers, such as styrene, α-methylstyrene, vinyltoluene, vinylcarbazole and mixtures of these monomeric compounds, may be polymerized at temperatures from 70° to 200° C. in the presence of polymerization initiators in the form of organic peroxides, especially diacylperoxides, such as benzoylperoxide, dialkylperoxides such as ditertiary butylperoxide, and peresters such as tertiary-butylperacetate and tertiary-butylperbenzoate.

The average molecular weight of the polymers thus obtained depends upon the rate of polymerization. The latter is determined to a large extent by: (a) the nature and the concentration of the peroxidic initiator and (b) the temperature at which the polymerization takes place. As a general rule, the average molecular weight of the polymers is inversely proportional to the rate of polymerization. An increase in the rate of polymerization, e.g. by increasing the polymerization temperature, leads to a decrease in molecular weight. Therefore, in the peroxidic polymerization of e.g. styrene, it is necessary, as far as the polymerization temperature is concerned, to keep to a maximum, because of the requirements, in practice, as to average molecular weight.

According to the present invention, it has surprisingly been found that, by using peroxides of the general formula

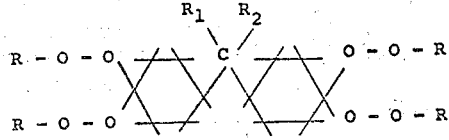

(in which R represents a tertiary alkyl or tertiary aralkyl radical and $R_1$ and $R_2$ each represents an alkyl radical with 1 or 2 carbon atoms) in the preparation of polymers from vinylaromatic monomers, preferably using polymerization temperatures between 70° and 200° C., not only are higher rates of polymerization obtained than by using the peroxides hitherto employed under the same conditions, but also the polymers obtained have higher average molecular weights.

It has also been found that, in the polymerization of vinylaromatic monomers to form polymers having the same average molecular weight by using peroxides according to the present invention on the one hand and peroxides hitherto employed for this purpose on the other hand, the polymers obtained with the aid of the peroxides according to the present invention are qualitatively better. This is shown by a higher impact strength, a higher melt index and a lower residual content of e.g. styrene in the polymeric products.

The peroxides employed in carrying the present invention into effect may be obtained by reacting a compound of the general formula

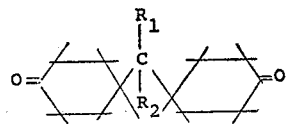

(in which $R_1$ and $R_2$ have the meanings defined above) with a tertiary alkyl or tertiary aralkyl hydroperoxide, in the presence of an acid-reacting catalyst, and eliminating from the reaction zone the water formed during the reaction.

The peroxide preparation reaction is preferably carried out in benzene at a temperature of 20°–50° C., the water formed during the reaction being eliminated by azeotropic distillation with benzene under reduced pressure.

The peroxides preferably employed for the polymerization reaction include:

2,2-bis(4,4-ditertiary-butyl-peroxy-cyclohexyl)-propane,
2,2-bis(4,4-ditertiary-amyl-peroxycyclohexyl)-propane,
2,2-bis(4,4-dicumyl-peroxycyclohexyl)-propane, and
2,2-bis(4,4-ditertiary-butyl-peroxycyclohexyl)-butane.

The present invention is further illustrated by the following examples. Where intrinsic viscosity ($\eta$) is mentioned in these examples, it means the viscosity as stated in Allen: "Characterization of Polymers" (Butterworth, London 1959) p. 173. It is expressed in l./g. and is measured at 25° C. in toluene as a solvent.

The average molecular weights are calculated according to the formula $$\bar{M}_v = 2.88 \times 10^6 \times (\eta)^{1.247}$$

(See J. W. Breitenbach, "Monatshefte fur Chemie," 159 (1950) 455.)

EXAMPLE 1

A mixture of 118 g. (0.5 mole) of 2,2-bis(4-ketocyclohexyl)-propane, 281 g. (3 moles) of tertiary-butyl-hydroperoxide and 0.8 ml of $H_2SO_4$ (70% by weight) in 600 ml. of benzene, was heated at a temperature of 40° C. The water formed during the reaction was eliminated by azeotropic distillation with benzene under reduced pressure. During the distillation of the water, the benzene was returned to the reaction mixture. This process was continued for 2 hours, to a maximum final pot temperature of 40° C.

Subsequently, the reaction mixture was freed from acid by treatment with 100 ml. of sodium bicarbonate (5%) and subsequently twice with 250 ml. of water. Thereafter, in order to eliminate the volatile constituents, it was evaporated in vacuo at a temperature of 40° C. 280 g. of crude peroxide in solid form were thus obtained. This product was taken up in a mixture of 420 ml. of ether and 980 ml. of ethanol and this solution was then allowed to crystallize by cooling to 0° C.

After filtration, 228 g. of a white crystalline 2,2-bis(4,4 - ditertiary-butyl-peroxycyclohexyl)-propane was obtained, namely a yield of 81% of theoretical, calculated on the 2,2-bis(4-ketocyclohexyl)-propane.

Active oxygen content 11.30% (theor. 11.43%).
Carbon oxygen content 66.21% (theor. 66.43%).
Hydrogen oxygen content 10.38% (theor. 10.71%).

This peroxide was then compared as a polymerization initiator with equal parts by weight of benzoylperoxide, tertiary-butylperbenzoate and tertiary-butylperacetate. For this purpose, 100 parts by weight of inhibitor-free styrene and 0.2 part by weight of peroxide were introduced into a glass reaction vessel. After removal of atmospheric oxygen, the reaction vessel was closed and heated to a temperature of 110° C. The results obtained are given in the following Table I:

and time, and the results obtained are given in the following Table II:

TABLE II

| Peroxide | Percent peroxide | Temp., °C. | Reaction time in hours | Percent conversion | $(\eta)$ | $\overline{M}_v$ |
|---|---|---|---|---|---|---|
| 2,2-bis(4,4-ditert. butylperoxy-cyclohexyl) propane | 0.20 | 110 | 3 | 99.6 | 0.110 | 185,000 |
| Do | 0.15 | 110 | 5 | 100.0 | 0.122 | 210,000 |
| Do | 0.10 | 110 | 5 | 98.8 | 0.132 | 230,000 |
| Do | 0.20 | 120 | 2 | 97.3 | 0.107 | 180,000 |
| Do | 0.20 | 130 | 1.5 | 87.4 | 0.091 | 145,000 |
| Do | 0.20 | 100 | 6 | 98.7 | 0.162 | 295,000 |
| Tert. butyl-peracetate | 0.20 | 110 | 5 | 100.0 | 0.075 | 115,000 |
| Do | 0.20 | 100 | 6 | 94.2 | 0.138 | 245,000 |
| Do | 0.10 | 100 | 6 | 60.9 | 0.127 | 220,000 |

EXAMPLE 3

Into an autoclave from which the air had been removed by means of nitrogen, there were introduced successively:
200 parts by weight of distilled water.
0.3 part by weight of a polyvinyl alcohol (marketed by E. I. du Pont de Nemours under the trade name Elvanol 50–42).

TABLE I

| | Peroxide | Reaction time in hours | Percent conversion | $(\eta)$ | $\overline{M}_v$ |
|---|---|---|---|---|---|
| a | 2,2-bis(4,4-ditertiary-butyl-peroxycyclohexyl)-propane | 1½ | 55.4 | 0.095 | 153,000 |
| b | ......do...... | 2 | 81.5 | 0.119 | 205,000 |
| c | ......do...... | 3½ | 97.8 | 0.132 | 230,000 |
| d | Dibenzoylperoxide | 2 | 48.5 | 0.078 | 120,000 |
| e | ......do...... | 6 | 72.0 | 0.086 | 136,000 |
| f | Tertiary-butylperbenzoate | 2 | 40.9 | 0.078 | 120,000 |
| g | ......do...... | 6 | 99.5 | 0.115 | 190,000 |
| h | Tertiary-butylperacetate | 2 | 52.5 | 0.068 | 102,000 |
| i | ......do...... | 6 | 99.4 | 0.097 | 157,000 |

It appears from experiments a, d, f and h that under the prevailing circumstances 2,2-bis(4,4-ditertiary-butyl-peroxycyclohexyl)-propane, in comparison with the other peroxides mentioned in the table, causes the most rapid polymerization.

It appears from experiments a and h that with the use of a peroxide according to the present invention, notwithstanding the higher rate of polymerization at almost the same conversion degree, a higher molecular weight is obtained. This also appears from experiments c, g and i, in which the polymerization was almost complete.

EXAMPLE 2

2,2-bis(4,4-ditertiary - butyl - peroxycyclohexyl)-propane, prepared in the manner as described in Example 1, was compared as a polymerization initiator for styrene with tertiary-butyl-peracetate.

The polymerization reaction conditions such as the peroxide percentage used, the polymerization temperature 100 parts by weight of inhibitor-free styrene.
0.2 part by weight of 2,2-bis(4,4-ditertiary-butyl-peroxycyclohexyl)-propane obtained as described in Example 1.

After a reaction time of 4 hours at 110° C., complete conversion was obtained. The intrinsic viscosity $(\eta)$ and the molecular weight $\overline{M}_v$ were 0.136 and 240,000 respectively.

After polymerization for 6 hours under otherwise similar conditions, but using 0.2 part by weight of tertiary-butyl-peracetate instead of 2,2-bis(4,4-ditertiary-butyl-peroxycyclohexyl)-propane, a completely converted product was obtained, the intrinsic viscosity $(\eta)$ and the molecular weight $\overline{M}_v$ of which were 0.099 and 160,000 respectively.

EXAMPLE 4

In the way as described in Example 3, 100 parts by weight of styrene were polymerized with 0.4 part by weight of 2,2-bis(4,4-ditertiary-butyl-peroxycyclohexyl)-propane and an equal quantity of styrene was polymerized with 0.2 part by weight of tertiary butyl-peracetate to polymers with about the same molecular weight.

The results obtained are given in the following Table III:

TABLE III

| Peroxide | $(\eta)$ | $\overline{M}_v$ | Impact strength, Kg./cm./cm.² | Melt-index | Residual styrene content in percent |
|---|---|---|---|---|---|
| 0.4% of 2,2-bis(4,4-ditert. butyl-peroxycyclohexyl)-propane | 0.100 | 163,000 | 7.3 | 0.26 | 0.00 |
| 0.2% of tert. butyl-peracetate | 0.103 | 168,000 | 6.1 | 0.19 | 0.02 |

The impact strength was determined according to the ASTM-0256 method Charpy, not notched.

The melt index was executed according to B.S. 2872 (part 1, 1956) at a temperature of 190° C.

In carrying the present invention into effect, the polymerization reaction is preferably effected at a temperature of 100° to 130° C., as illustrated by the above examples. The amount of peroxidic initiator used is preferably in the range of 0.05–1.00% by weight, based upon the initial monomer.

While specific examples of preferred methods embodying the present invention have been described above, it will be apparent that many changes and modifications may be made in the details of the methods of procedure without departing from the true spirit of the invention. It will therefore be understood that the particular methods set forth above are intended to be illustrative only, and are not intended to limit the scope of the invention which is defined by the following claims.

What is claimed is:

1. In the peroxidic polymerization of vinylaromatic compounds, the step which comprises mixing the vinylaromatic compound with a peroxy compound having the general formula

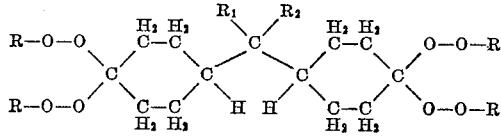

in which R represents a radical selected from the class consisting of tertiary alkyl and tertiary aralkyl radicals and $R_1$ and $R_2$ each represents an alkyl radical having from 1 to 2 carbon atoms, in an amount of about 0.05 to 1.00% by weight calculated on the starting vinylaromatic compound, and heating the mixture at a temperature from about 70° to 200° C.

2. A process as defined in claim 1, in which the peroxy compound is 2,2 - bis(4,4-ditertiary-butylperoxy-cyclohexyl)-propane.

3. A process as defined in claim 1, in which the vinylaromatic compound is styrene.

References Cited
UNITED STATES PATENTS

| | | | |
|---|---|---|---|
| 2,521,754 | 9/1950 | Shusman | 260—93.5 |
| 2,534,120 | 12/1950 | Glick | 260—93.5 |
| 2,813,127 | 11/1957 | White | 260—610 |

JAMES A. SEIDLECK, *Primary Examiner.*

JOSEPH L. SCHOFER, *Examiner.*